United States Patent
Lu et al.

(10) Patent No.: US 12,049,588 B2
(45) Date of Patent: Jul. 30, 2024

(54) DELAYED GELATION POLYMER SYSTEM FOR HIGH TEMPERATURE AND HIGH SALINITY APPLICATIONS

(71) Applicants: CNPC USA Corporation, Houston, TX (US); Beijing Huamei, Inc., Beijing (CN); China National Petroleum Corporation, Beijing (CN)

(72) Inventors: Meng Lu, Sugar Land, TX (US); Danhua Zhang, Houston, TX (US); Fuchen Liu, Houston, TX (US); Nancy Zhou, Sugar Land, TX (US); Jianshen Li, Houston, TX (US); Weibin Zha, Houston, TX (US)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

(21) Appl. No.: 18/129,662

(22) Filed: Mar. 31, 2023

(65) Prior Publication Data
US 2023/0265335 A1   Aug. 24, 2023

Related U.S. Application Data

(63) Continuation-in-part of application No. 16/703,632, filed on Dec. 4, 2019, now Pat. No. 11,753,581.

(51) Int. Cl.
C09K 8/512   (2006.01)
E21B 43/16   (2006.01)

(52) U.S. Cl.
CPC .............. *C09K 8/512* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 7,901,543 B2 | 3/2011 | St. John et al. | |
| 8,349,960 B2 | 1/2013 | Gaeberlein | |
| 9,163,103 B2 | 10/2015 | Reichenbach-Klinke | |
| 9,464,504 B2 | 10/2016 | Kakadijan | |
| 9,796,902 B2 | 10/2017 | Osorio | |
| 2009/0302195 A1 | 12/2009 | Muenchausen | |
| 2011/0095227 A1 | 4/2011 | Herth | |
| 2012/0111567 A1* | 5/2012 | Lin | C08K 7/14 507/224 |
| 2014/0144628 A1* | 5/2014 | Moradi-Araghi | C09K 8/588 166/275 |
| 2014/0158355 A1 | 6/2014 | Wuthrich | |

OTHER PUBLICATIONS

International Search Report and Written Opinion dated Aug. 30, 2023 in corresponding PCT Application No. PCT/US23/18622.

* cited by examiner

*Primary Examiner* — Charles R Nold
(74) *Attorney, Agent, or Firm* — Hogan Lovells US LLP

(57) ABSTRACT

This disclosure describes the composition and methods of use for a novel delayed polymer gelation system for high temperature and high salinity applications. This polymer gelation system includes a polymer of acrylamide, AMPS and 500-5000 ppm polyethylene glycol diacrylate in inverse emulsion form, and a polyethyleneimine (PEI) with a MW of 2,000-30,000 daltons as the crosslinking agent.

20 Claims, 2 Drawing Sheets

DELAYED GELATION POLYMER SYSTEM FOR HIGH TEMPERATURE AND HIGH SALINITY APPLICATIONS

CROSS-REFERENCE(S) TO RELATED APPLICATION(S)

This application is a continuation-in-part of U.S. patent application Ser. No. 16/703,632, filed Dec. 4, 2019, titled Delayed Gelation Polymer System, the entire disclosure of which is incorporated by reference herein for all intents and purposes.

FIELD

The disclosure relates generally to a delayed gelation polymer system for high temperature and high salinity in oil field applications. The disclosure relates specifically to a polymer and a crosslinker to form stable gels with delayed gelation time.

BACKGROUND

Water injection is used for increasing oil production by increasing reservoir pressure and sweeping oil to the production well. However, the sweep efficiency is limited by the high permeability zones in the reservoir. Water will prefer to go through the high permeability zones, bypassing the less permeable oil-bearing zones. There are several methods that have been proposed to block the high permeability zones with polymer gels. However, there are two major problems with these polymer gelation systems. First, stable polymer gels could not be formed in high temperature and high salinity environments. Second, the gelation of polymer system needs to be delayed in order to place the polymers in the high permeability zones deep in the formation. Previous methods require a delayed gelling agent in addition to the polymer and the crosslinking agent to achieve the delayed gelation. Therefore, there is a need in the art for polymer systems capable of delayed gelation in high temperature and high salinity environments.

SUMMARY

Disclosed herein is a delayed gelation polymer system for high temperature and high salinity applications that does not require a delayed gelling agent.

An embodiment of the disclosure is a polymer system comprising a polymer comprising acrylamide; 2-acrylamido-2-methylpropane sulfonic acid (AMPS); polyethylene glycol diacrylate; sodium formate; a crosslinker comprising polyethyleneimine; a temperature stabilizer; and wherein the polymer is in inverse emulsion form. In an embodiment, the polymer is at a concentration of about 25-35% in the inverse emulsion. In an embodiment, the polymer comprises about 50-90% acrylamide; about 10-50% AMPS; about 500-5000 parts per million polyethylene glycol diacrylate; about 100-2000 parts per million sodium formate; and wherein the crosslinker comprises about 100-1500 parts per million polyethyleneimine. In an embodiment, the polymer comprises about 80% acrylamide; about 20% AMPS; about 500 parts per million polyethylene glycol diacrylate; about 400 parts per million sodium formate; and wherein the crosslinker comprises about 1200 parts per million (ppm) polyethyleneimine. In an embodiment, the polymer comprises about 60% acrylamide; about 40% AMPS; about 500 parts per million polyethylene glycol diacrylate; about 400 parts per million sodium formate; and wherein the crosslinker comprises about 200 ppm polyethyleneimine. In an embodiment, the crosslinker comprises polyethyleneimine at a molecular weight of about 2,000-30,000 daltons. In an embodiment, the temperature stabilizer comprises about 0.02-0.1 wt % thiourea. In an embodiment, the viscosity of the polymer system is about 1-10 cp before gelation. In an embodiment, the polyethyleneimine has a molecular weight of about 10,000 daltons. In an embodiment, the polymer system undergoes gelation at a temperature between about 80-130 degrees Celsius in a brine with total dissolved solids in the range of about 50,000 mg/L to 200,000 mg/L.

An embodiment of the disclosure is a method of improving sweep efficiency for an oil-bearing zone comprising preparing a polymer system comprising: a polymer comprising: acrylamide; 2-acrylamido-2-methylpropane sulfonic acid (AMPS); polyethylene glycol diacrylate; sodium formate; a crosslinker comprising polyethyleneimine; a temperature stabilizer; wherein the polymer is in inverse emulsion form; and injecting the polymer system into a wellbore to improve the sweep efficiency. In an embodiment, the polymer is at a concentration of about 25-35%. In an embodiment, the polymer comprises about 50-90% acrylamide; about 10-50% AMPS; about 500-5000 parts per million polyethylene glycol diacrylate; about 100-2000 parts per million sodium formate; and wherein the crosslinker comprises about 100-1500 parts per million polyethyleneimine. In an embodiment, the polymer comprises about 80% acrylamide; about 20% AMPS; about 500 parts per million polyethylene glycol diacrylate; about 400 parts per million sodium formate; and wherein the crosslinker comprises about 1200 ppm polyethyleneimine. In an embodiment, the polymer comprises about 60% acrylamide; about 40% AMPS; about 500 parts per million polyethylene glycol diacrylate; about 400 parts per million sodium formate; and wherein the crosslinker comprises about 200 ppm polyethyleneimine. In an embodiment, the crosslinker comprises polyethyleneimine at a molecular weight of about 2,000-30,000 daltons. In an embodiment, the temperature stabilizer comprises about 0.02-0.1 wt % thiourea. In an embodiment, the viscosity of the polymer system is about 1-10 cp before gelation. In an embodiment, the polyethyleneimine has a molecular weight of about 10,000 daltons. In an embodiment, the polymer system undergoes gelation at a temperature between about 80-130 degrees Celsius in a brine with total dissolved solids in the range of about 50,000 mg/L to 200,000 mg/L.

In an embodiment, thiourea is used as a temperature stabilizer. In an embodiment, thiourea can be used at amounts of 0.02-0.1 wt %. In an embodiment, sodium thiosulfate pentahydrate can be used as a temperature stabilizer.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
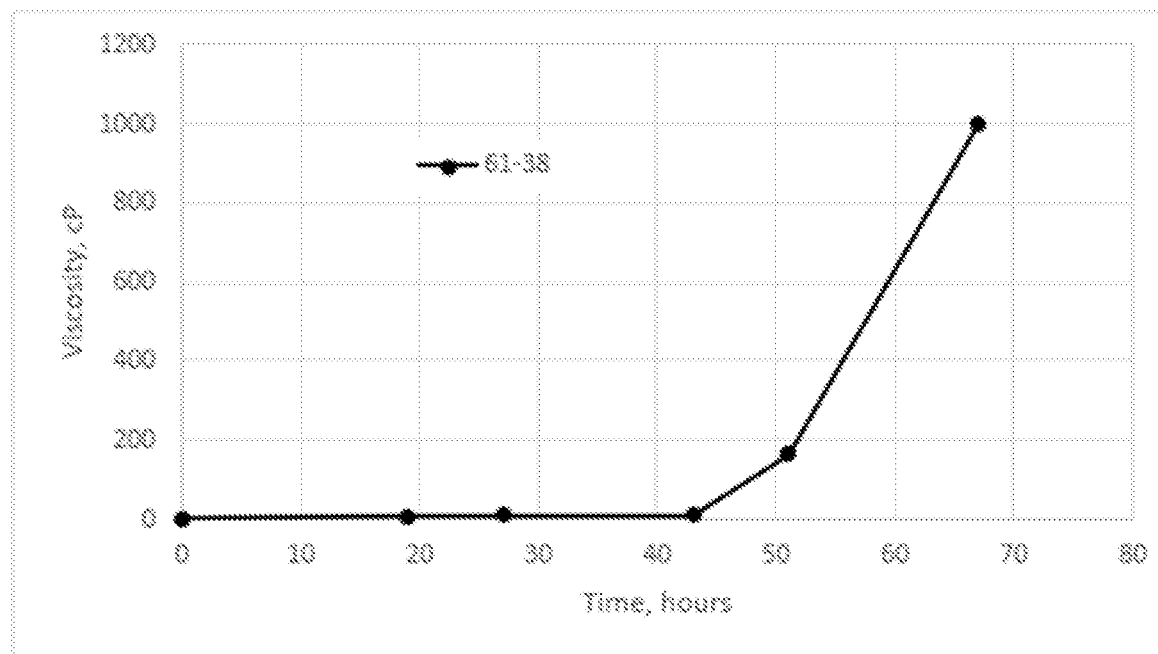
FIG. 1 depicts a graph of viscosity versus time during the delayed gelation process of crosslinkable polymer ML61-38.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present invention are not intended to be interpreted as excluding the existence of additional embodiments that also incorporate the recited features. Furthermore, reference to terms such as "above," "below," "upper," "lower," "side," "front," "back," or other terms regarding orientation are made with reference to the illustrated embodiments and are not intended to be limiting or exclude other orientations.

In an embodiment, the delayed polymer gelation system can contain the cross-linkable polymer, the polyethyleneimine (PEI) crosslinker, and a temperature stabilizer. Previous systems have required use of an additional component, a delayed gelling agent, to achieve a similar delay effect. Previous systems were also unstable in environments of high temperature or high salinity.

In an embodiment, the delayed polymer gelation system can have a low initial viscosity of 1-10 cp before gelation. This low viscosity can help the delayed gelation system to penetrate deep into the formation. This can result in better selectivity for a high permeability zone over a low permeability oil-bearing zone. The delayed gelation can be useful in placing the polymer and crosslinker deep into the target high permeability zone to form stable gels in situ and improve the sweep efficiency for the oil-bearing low permeability zone.

In an embodiment, the delayed polymer gelation system can tolerate high temperature and high salinity conditions. The application temperature can be between 80-130° C. The polymer gel can be formed in high salinity brines with Total Dissolved Solids (TDS) in the range of 50,000-200,000 mg/L.

In an embodiment, the polymer system can first include a polymer of acrylamide, AMPS, and 500-5000 ppm polyethylene glycol diacrylate in inverse emulsion form. In another embodiment, concentration of the polyethylene glycol diacrylate is from about 500-3500 ppm. In another embodiment, concentration of the polyethylene glycol diacrylate is from about 500-2000 ppm. In another embodiment, concentration of the polyethylene glycol diacrylate is from about 500-1000 ppm. In another embodiment, concentration of the polyethylene glycol diacrylate is from about 4000-5000 ppm. In another embodiment, concentration of the polyethylene glycol diacrylate is from about 3000-4000 ppm. In another embodiment, concentration of the polyethylene glycol diacrylate is from about 2000-3000 ppm. In another embodiment, concentration of the polyethylene glycol diacrylate is from about 1000-2000 ppm. In another embodiment, concentration of the polyethylene glycol diacrylate is from about 1500-4000 ppm. In another embodiment, concentration of the polyethylene glycol diacrylate is from about 2000-5000 ppm. In another embodiment, concentration of the polyethylene glycol diacrylate is from about 3000-5000 ppm.

In an embodiment, the polymer can contain about 50-90% acrylamide monomer. In another embodiment, the polymer can contain about 50-60% acrylamide monomer. In another embodiment, the polymer can contain about 60-70% acrylamide monomer. In another embodiment, the polymer can contain about 70-80% acrylamide monomer. In another embodiment, the polymer can contain about 80-90% acrylamide monomer. In another embodiment, the polymer can contain about 70-90% acrylamide monomer. In another embodiment, the polymer can contain about 60-90% acrylamide monomer. In another embodiment, the polymer can contain about 50-70% acrylamide monomer. In another embodiment, the polymer can contain about 50-80% acrylamide monomer. In another embodiment, the polymer can contain about 55-85% acrylamide monomer. In another embodiment, the polymer can contain about 60-80% acrylamide monomer. In another embodiment, the polymer can contain about 65-85% acrylamide monomer.

In an embodiment, the polymer can contain about 10-50% of 2-acrylamido-2-methylpropane sulfonic acid (AMPS) monomer. In another embodiment, the polymer can contain about 10-20% AMPS monomer. In another embodiment, the polymer can contain about 20-30% AMPS monomer. In another embodiment, the polymer can contain about 30-40% AMPS monomer. In another embodiment, the polymer can contain about 40-50% AMPS monomer. In another embodiment, the polymer can contain about 10-30% AMPS monomer. In another embodiment, the polymer can contain about 10-40% AMPS monomer. In another embodiment, the polymer can contain about 20-40% AMPS monomer. In another embodiment, the polymer can contain about 20-50% AMPS monomer. In another embodiment, the polymer can contain about 30-40% AMPS monomer. In another embodiment, the polymer can contain about 30-50% AMPS monomer. In another embodiment, the polymer can contain about 15-45% AMPS monomer. In another embodiment, the polymer can contain about 25-45% AMPS monomer.

In an embodiment, the polymer can contain polyethylene glycol diacrylate at a molecular weight of about 150-7500 g/mol. In another embodiment, the polyethylene glycol diacrylate can have a molecular weight of about 150-500 g/mol. In another embodiment, the polyethylene glycol diacrylate can have a molecular weight of about 150-1500 g/mol. In another embodiment, the polyethylene glycol diacrylate can have a molecular weight of about 150-3000 g/mol. In another embodiment, the polyethylene glycol diacrylate can have a molecular weight of about 150-4500 g/mol. In another embodiment, the polyethylene glycol diacrylate can have a molecular weight of about 150-6000 g/mol. In another embodiment, the polyethylene glycol diacrylate can have a molecular weight of about 500-7500 g/mol. In another embodiment, the polyethylene glycol diacrylate can have a molecular weight of about 1500-7500 g/mol. In another embodiment, the polyethylene glycol diacrylate can have a molecular weight of about 3000-7500 g/mol. In another embodiment, the polyethylene glycol diacrylate can have a molecular weight of about 4500-7500 g/mol. In another embodiment, the polyethylene glycol diacrylate can have a molecular weight of about 6000-7500 g/mol. In another embodiment, the polyethylene glycol diacrylate can have a molecular weight of about 4500-6000 g/mol. In another embodiment, the polyethylene glycol diacrylate can have a molecular weight of about 3000-6000 g/mol. In another embodiment, the polyethylene glycol diacrylate can have a molecular weight of about 1500-6000 g/mol. In another embodiment, the polyethylene glycol diacrylate can have a molecular weight of about 500-6000 g/mol. In another embodiment, the polyethylene glycol diacrylate can have a molecular weight of about 1500-3000 g/mol. In another embodiment, the polyethylene glycol diacrylate can have a molecular weight of about 500-1500 g/mol. In another embodiment, the polyethylene glycol diacrylate can have a molecular weight of about 1500-4500 g/mol. In another embodiment, the polyethylene glycol diacrylate can have a molecular weight of about 3000-4500 g/mol.

In an embodiment, the polymer can be in inverse emulsion form with a polymer concentration of about 25-35%. In another embodiment, the polymer concentration is about 25-27%. In another embodiment, the polymer concentration is about 27-29%. In another embodiment, the polymer concentration is about 29-31%. In another embodiment, the polymer concentration is about 31-33%. In another embodiment, the polymer concentration is about 33-35%. In another embodiment, the polymer concentration is about 27-31%. In another embodiment, the polymer concentration is about 27-33%. In another embodiment, the polymer concentration is about 27-35%. In another embodiment, the polymer concentration is about 29-33%. In another embodiment, the polymer concentration is about 29-35%. In another embodiment, the polymer concentration is about 31-35%. In another embodiment, the polymer concentration is about 26-32%. In another embodiment, the polymer concentration is about 28-34%.

In an embodiment, the polymer can contain 100-2000 ppm sodium formate. In an embodiment, the polymer can contain 100-400 ppm sodium formate. In an embodiment, the polymer can contain 100-800 ppm sodium formate. In an embodiment, the polymer can contain 100-1200 ppm sodium formate. In an embodiment, the polymer can contain 100-1600 ppm sodium formate. In an embodiment, the polymer can contain 400-800 ppm sodium formate. In an embodiment, the polymer can contain 400-1200 ppm sodium formate. In an embodiment, the polymer can contain 400-1600 ppm sodium formate. In an embodiment, the polymer can contain 400-2000 ppm sodium formate. In an embodiment, the polymer can contain 800-1200 ppm sodium formate. In an embodiment, the polymer can contain 800-1600 ppm sodium formate. In an embodiment, the polymer can contain 800-2000 ppm sodium formate. In an embodiment, the polymer can contain 1200-1600 ppm sodium formate. In an embodiment, the polymer can contain 1200-2000 ppm sodium formate. In an embodiment, the polymer can contain 1600-2000 ppm sodium formate.

In an embodiment, the gelation system can also include polyethyleneimine (PEI) crosslinker with a molecular weight of about 2,000-30,000 daltons as the crosslinking agent. In another embodiment, the PEI crosslinker has a molecular weight of about 2,000-5,000 daltons. In another embodiment, the PEI crosslinker has a molecular weight of about 2,000-10,000 daltons. In another embodiment, the PEI crosslinker has a molecular weight of about 2,000-15,000 daltons. In another embodiment, the PEI crosslinker has a molecular weight of about 2,000-20,000 daltons. In another embodiment, the PEI crosslinker has a molecular weight of about 2,000-25,000 daltons. In another embodiment, the PEI crosslinker has a molecular weight of about 5,000-10,000 daltons. In another embodiment, the PEI crosslinker has a molecular weight of about 10,000-15,000 daltons. In another embodiment, the PEI crosslinker has a molecular weight of about 15,000-20,000 daltons. In another embodiment, the PEI crosslinker has a molecular weight of about 20,000-25,000 daltons. In another embodiment, the PEI crosslinker has a molecular weight of about 25,000-30,000 daltons. In another embodiment, the PEI crosslinker has a molecular weight of about 20,000-30,000 daltons. In another embodiment, the PEI crosslinker has a molecular weight of about 10,000-25,000 daltons. In another embodiment, the PEI crosslinker has a molecular weight of about 10,000-20,000 daltons.

In an embodiment, use of the delayed polymer gelation system disclosed in this invention occurred at a temperature of about 80-130° C., in a brine with salinity of 50,000-200,000 mg/L, and gelation of the polymer system can be delayed from about 1 day to 3 weeks by controlling the concentration of the polymer from about 2000 ppm to 5000 ppm and the PEI crosslinker from about 100-1500 ppm.

EXAMPLES

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

Example 1. Delayed Gelation of Polymer ML61-38

ML61-38 was synthesized by inverse emulsion polymerization, which refers to hydrophilic monomers, frequently used in aqueous solution, emulsified in a continuous oil phase using water-in-oil emulsifying surfactants and polymerized in the presence of water-soluble or oil-soluble initiators. 400 ppm of sodium formate was added to the reaction mixture as a chain transfer agent to modify the polymer structure.

2500 ppm of ML61-38, a polymer containing 80% acrylamide, 20% AMPS, and 500 ppm polyethylene glycol diacrylate-250 in inversion emulsion form with 30% active polymer was added to a deoxygenated synthetic brine of 50,000 mg/L salinity, together with 1,200 ppm polyethyleneimine of 10,000 daltons molecular weight. The brine solution was then taken into an oxygen-free glove box and incubated at 85-95° C. for various lengths of time before measuring the viscosity of the solution. FIG. 1.

Example 2. Delayed Gelation of Polymer ML61-42

ML61-42 was synthesized by inverse emulsion polymerization, which refers to hydrophilic monomers, frequently used in aqueous solution, emulsified in a continuous oil phase using water-in-oil emulsifying surfactants and polymerized in the presence of water-soluble or oil-soluble initiators. 400 ppm of sodium formate was added to the reaction mixture as a chain transfer agent to modify the polymer structure.

Figure 2:
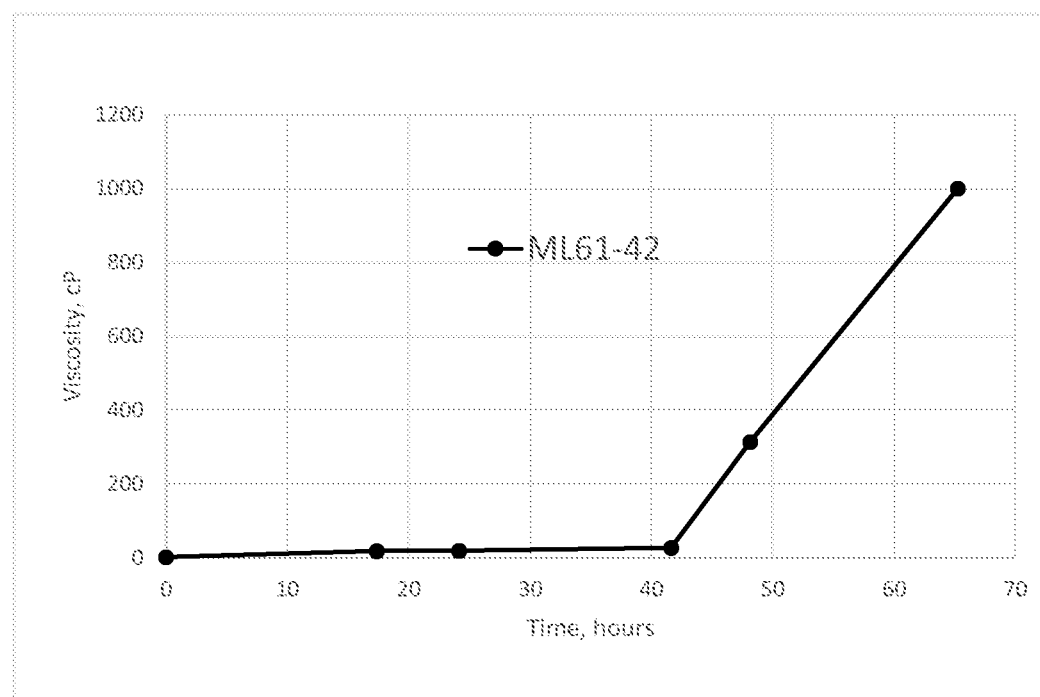
FIG. 2 depicts a graph of viscosity versus time during the delayed gelation process of crosslinkable polymer ML61-42.

4500 ppm of ML61-42, a polymer containing 60% acrylamide, 40% AMPS, and 500 ppm polyethylene glycol diacrylate-250 in inversion emulsion form with 30% active polymer was added to a deoxygenated synthetic brine of 200,000 mg/L salinity, together with 200 ppm polyethyleneimine of 10,000 daltons molecular weight. The brine solution was then taken into an oxygen-free glove box and incubated at 115-125° C. for various lengths of time before measuring the viscosity of the solution. FIG. 2.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A polymer system comprising:
    a polymer comprising:
        acrylamide;
        2-acrylamido-2-methylpropane sulfonic acid (AMPS);
        polyethylene glycol diacrylate; and
        sodium formate;
    a crosslinker comprising polyethyleneimine; and
    a temperature stabilizer;
    wherein the polymer is in inverse emulsion form.
2. The polymer system of claim 1 wherein the polymer is at a concentration of about 25-35%.
3. The polymer system of claim 1 wherein the polymer comprises:
    about 50-90% acrylamide;
    about 10-50% AMPS;
    about 500-5000 ppm polyethylene glycol diacrylate; and
    about 100-2000 ppm sodium formate;
    wherein the crosslinker comprises about 100-1500 ppm polyethyleneimine.
4. The polymer system of claim 3 wherein the polymer comprises:
    about 80% acrylamide;
    about 20% AMPS;
    about 500 ppm polyethylene glycol diacrylate; and
    about 400 ppm sodium formate;
    wherein the crosslinker comprises about 1200 ppm polyethyleneimine.
5. The polymer system of claim 3 wherein the polymer comprises:
    about 60% acrylamide;
    about 40% AMPS;
    about 500 ppm polyethylene glycol diacrylate; and
    about 400 ppm sodium formate;
    wherein the crosslinker comprises about 200 ppm polyethyleneimine.
6. The polymer system of claim 1 wherein the crosslinker comprises polyethyleneimine at a molecular weight of about 2,000-30,000 daltons.
7. The polymer system of claim 6 wherein the polyethyleneimine has a molecular weight of about 10,000 daltons.
8. The polymer system of claim 1 wherein the temperature stabilizer comprises about 0.02-0.1 wt % thiourea.
9. The polymer system of claim 1 wherein the viscosity of the polymer system is about 1-10 cp before gelation.
10. The polymer system of claim 1 wherein the polymer system undergoes gelation at a temperature between about 80-130 degrees Celsius and wherein the polymer gel is formed in a brine with total dissolved solids in the range of about 50,000 mg/L to 200,000 mg/L.
11. A method of improving sweep efficiency for an oil-bearing zone comprising:
    preparing a polymer system comprising:
        a polymer comprising:
            acrylamide;
            2-acrylamido-2-methylpropane sulfonic acid (AMPS);
            polyethylene glycol diacrylate; and
            sodium formate;
        a crosslinker comprising polyethyleneimine; and
        a temperature stabilizer;
        wherein the polymer is in inverse emulsion form; and
    injecting the polymer system into a wellbore to improve the sweep efficiency.
12. The method of claim 11 wherein the polymer is at a concentration of about 25-35% in the inverse emulsion.
13. The method of claim 11 wherein the polymer comprises
    about 50-90% acrylamide;
    about 10-50% AMPS;
    about 500-5000 ppm polyethylene glycol diacrylate; and
    about 100-2000 ppm sodium formate;
    wherein the crosslinker comprises about 100-1500 ppm polyethyleneimine.
14. The method of claim 13 wherein the polymer comprises
    about 80% acrylamide;
    about 20% AMPS;
    about 500 ppm polyethylene glycol diacrylate; and
    about 400 ppm sodium formate;
    wherein the crosslinker comprises about 1200 ppm polyethyleneimine.

15. The method of claim 13 wherein the polymer comprises
- about 60% acrylamide;
- about 40% AMPS;
- about 500 ppm polyethylene glycol diacrylate; and
- about 400 ppm sodium formate;
- wherein the crosslinker comprises about 200 ppm polyethyleneimine.

16. The method of claim 11 wherein the crosslinker comprises polyethyleneimine at a molecular weight of about 2,000-30,000 daltons.

17. The method of claim 16 wherein the polyethyleneimine has a molecular weight of about 10,000 daltons.

18. The method of claim 11 wherein the temperature stabilizer comprises about 0.02-0.1 wt % thiourea.

19. The method of claim 11 wherein the viscosity of the polymer system is about 1-10 cp before gelation.

20. The method of claim 11 wherein the polymer system undergoes gelation at a temperature between about 80-130 degrees Celsius and wherein the polymer gel is formed in a brine with total dissolved solids in the range of about 50,000 mg/L to 200,000 mg/L.

\* \* \* \* \*